US 6,687,764 B2

United States Patent
Sonoda et al.

(10) Patent No.: US 6,687,764 B2
(45) Date of Patent: Feb. 3, 2004

(54) FILE I/O CONTROL METHOD

(75) Inventors: Kouji Sonoda, Sagamihara (JP); Naoki Utsunomiya, Kunitachi (JP); Hiroyuki Kumazaki, Yokohama (JP); Toshiya Kurakake, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 10/024,336

(22) Filed: Dec. 21, 2001

(65) Prior Publication Data

US 2002/0091751 A1 Jul. 11, 2002

(30) Foreign Application Priority Data

Dec. 25, 2000 (JP) .......................... 2000-392686

(51) Int. Cl.$^7$ ............................................. G06F 13/00
(52) U.S. Cl. .............................. 710/6; 707/200; 710/39; 710/56; 711/150
(58) Field of Search .......................... 707/4, 200–201; 710/5–7, 20–21, 36–42, 52–56; 711/114, 137, 147–163

(56) References Cited

U.S. PATENT DOCUMENTS

| 5,715,452 | A | * | 2/1998 | Mori et al. .................. 707/201 |
| 5,758,149 | A | * | 5/1998 | Bierma et al. ................. 707/8 |
| 5,809,516 | A | * | 9/1998 | Ukai et al. .................... 711/114 |
| 6,101,558 | A | * | 8/2000 | Utsunomiya et al. .......... 710/6 |
| 6,347,343 | B1 | * | 2/2002 | Utsunomiya et al. .......... 710/6 |
| 6,385,624 | B1 | * | 5/2002 | Shinkai ....................... 707/201 |
| 6,457,097 | B1 | * | 9/2002 | Tamura ....................... 711/113 |

FOREIGN PATENT DOCUMENTS

JP 11-15720 1/1999

OTHER PUBLICATIONS

David Kotz et al., "Dynamic File–Access Characteristics of a Production Parallel Scientific Workload", Proceedings of Supercomputing, '94, Nov. 1994, pp. 640–649.
"MPI–2: Extensions to the Message–Passing Interface", Message Passing Interface Forum, http://www.mpi–forum.org/docs.docs.html.
Rajeev Thakur et al., "Data Sieving and Collective I/O in ROMIO", Proceedings of the 7th Symposium on the Frontiers of Massively Parallel Computation, Feb. 1999, pp. 182–189.
Sharad Garg, "TF1OPS PFS: Architecture and Design of A Highly Efficient Parallel File System", Proceedings of Supercomputing, '98, Nov. 10, 1999.

* cited by examiner

*Primary Examiner*—Christopher B. Shin
(74) *Attorney, Agent, or Firm*—McDermott, Will & Emery (57) ABSTRACT

In collective I/O processing in which a plurality of processes access the same file in a shared manner, when each user process issues an I/O request, the user process notifies the system of information on a file region accessed by all the processes; information for specifying whether or not a prefetch is performed, and information for specifying whether or not a disk preallocate is performed, together with the I/O requests issued by all associated processes, as hint information. The system provides a buffer for storing data in a file region accessed by all the processes based on the hint information, such that the I/O processing for all the processes is performed using this buffer.

19 Claims, 11 Drawing Sheets

| fd | req | buf | all blk | time |
|----|-----|-----|---------|------|
| 4  | 1-4 |     | 1-16    | 10s  |

FILE MANAGEMENT TABLE

| fd | GID | total | info |
|----|-----|-------|------|
| ... | | | |
| 4 | 4321 | 4 | |
| ... | | | |

1150 1151 1153 1154
1160
1121

FILE STRUCTURE TABLE

| sfile | blocks |
|-------|--------|
| 1521  | 1,5,9,13 |
| 1621  | 2,6,10,14 |
| 1721  | 3,7,11,15 |
| 1821  | 4,8,12,16 |

| r-sfile | r-GID | r-total | all sblk | r-cmd | r-req | r-data | time |
|---|---|---|---|---|---|---|---|
| 1521 | 4321 | 4 | #1,#2,#3,#4 | R | #1 | | 10s |

1910

SUB-COLLECTIVE I/O REQUEST TO sfile 1521

| sfile | GID | total | done | all sblk | cmd | buf | time |
|---|---|---|---|---|---|---|---|
| 1521 | 4321 | 4 | 1 | #1,#2,#3,#4 | R | | 10s |
| | | | ⋮ | | | | |
| | | | | | | | |

COLLECTIVE I/O MANAGEMENT TABLE

1560

COLLECTIVE I/O BUFFER

FIG. 7

FLOW OF ROUTINE PROCESSED BY FILE SERVER AGENT

FIG. 8

FLOW OF SUB-COLLECTIVE I/O REQUEST CREATION ROUTINE

FIG. 9

FLOW OF ROUTINE PROCESSED BY FILE SERVER

FIG. 10

FLOW OF TIME-OUT ROUTINE PROCESSED BY FILE SERVER

FIG. 11

FILE MANAGEMENT TABLE 3300

FIG. 12

| | | |
|---|---|---|
| CREATE HINT OBJECT | 4110 | MPI_INFO_CREATE(info) |
| SET I/O REGION HINT INFORMATION | 4120 | MPI_INFO_SET(info,'collective_region','1-16') |
| | 4130 | MPI_FILE_SET_INFO(fh,info) |
| SET I/O REGION HINT INFORMATION | 4140 | MPI_INFO_SET(info,'collbuf_lifetime','10') |
| | 4150 | MPI_FILE_SET_INFO(fh,info) |
| SET PREALLOCATE HINT INFORMATION | 4160 | MPI_INFO_SET(info,'prealloc','TRUE') |
| | 4170 | MPI_FILE_SET_INFO(fh,info) |
| COLLECTIVE WRITE REQUEST | 4180 | MPI_FILE_WRITE_AT_ALL(fh,off,but,num,data_type,status) |
| SET PREFETCH HINT INFORMATION | 4190 | MPI_INFO_SET(info,'prefetch','TRUE') |
| | 4200 | MPI_FILE_SET_INFO(fh,info) |
| COLLECTIVE READ REQUEST | 4210 | MPI_FILE_READ_AT_ALL(fh,off,but,num,data_type,status) |

FIG. 13

PREALLOCATE/ PREFETCH REQUEST TO sfile 1521

| sfile | GID | blk | cmd | time |
|---|---|---|---|---|
| 8001 | 8002 | 8003 | 8004 | 8005 |
| 1521 | 4321 | #1,#2,#3,#4 | PA/PF | 10s |

FIG. 14

FLOW OF HINT INFORMATION SETTING ROUTINE

FIG. 15

PREFETCH/PREALLOCATE ROUTINE PROCESSED BY FILE SERVER

FILE I/O CONTROL METHOD

BACKGROUND OF THE INVENTION

The present invention relates to a file I/O control method, a file management server, and a parallel computing system, and more particularly, to a file I/O control method, a file management server, and a parallel computing system for use in a parallel computer which operates a plurality of processes in concert for performing computations.

Parallel computing which initiates a plurality of processes on a parallel computer and operates the plurality of processes in concert for performing computations often employs an SPMD (Single Program Multiple Data stream) model in which all processes execute the same program codes to operate different data from one another. Since all the processes execute the same program codes in this model, I/O requests are often issued from all the processes substantially at the same timing. Particularly, the processing in a parallel program for scientific computations involves array data stored in files for use in the processing, so that the same array data is often divided into sub-regions among a plurality of processes. In this event, a certain process will have an access to data in a particular row or column. Such data in a particular row or column is typically arranged on a file in a noncontiguous manner. For this reason, a file access pattern of each process in a parallel program as mentioned above includes an access to a noncontiguous region.

"Dynamic file-access characteristics of a production parallel scientific workload", David Kots, Song Bac Tho, and Sriram Radhakrishanan, Proceedings of Supercomputing '94, pp. 640–649, November 1994 (hereinafter, Kots-94) points out the following two problems which are experienced by a program that has a file access pattern as mentioned above, when it issues an I/O request using a conventional UNIX interface.

(1) Since each process issues I/O requests corresponding to the number of noncontiguous regions, overhead caused by system calls increases.

(2) Since the system cannot recognize the relationship among I/O requests issued by a plurality of processes, random disk accesses are generated in response to the respective I/O requests.

Generally, a disk access is low in access speed, as compared with a memory access. Also, the performance of an random disk access is lower than the performance of an access to a contiguous region because of movements of a disk head involved in the random disk access. If respective processes that execute a parallel program access noncontiguous regions in a file as mentioned above, noncontiguous disk regions will be accessed to cause a significant degradation in the file I/O performance due to an inconsistent order of I/O requests issued from the respective processes.

Kots-94 further points out that the foregoing problems result from the fact that a UNIX type file I/O interface does not have a noncontiguous region access function and a function for specifying the relationship of file I/O among a plurality of processes. Thus, as a useful means for addressing these causes, Kots-94 suggests the use of a stride I/O interface, and a collective I/O interface through which all associated processes issue I/O requests to the same file.

The stride I/O interface enables noncontiguous regions on a file to be accessed with a single I/O request, while the collective I/O interface allows all of a plurality of processes to issue I/O requests to the same file.

A typical example of the foregoing interface may be MPI-IO which is defined in Section 9 of "MPI-2: Extensions to the Message-Passing Interface", Message Passing Interface Forum, http://www.mpi-forum.org/docs/docs. html (hereinafter called "MPI-2"). Also, "Data Sieving and Collective I/O in ROMIO", Rajeev Thakur, William Gropp, Ewing Lusk, Proceedings of the 7th Symposium on the Frontiers of Massively Parallel Computation, February 1999, pp. 182–189 (hereinafter called "ROMIO") is known. This is an exemplary implementation of MPI-IO.

According to ROMIO, a parallel program as mentioned above can be converted to accesses to a contiguous region by merging all I/O requests issued by respective processes through the collective I/O, even if the I/O requests involve accesses to noncontiguous regions, thereby improving the file I/O performance. The ROMIO waits for all associated processes until they have issued collective I/O requests, merges all the I/O requests, at the time all the collective I/O requests are issued, to convert them to accesses to a contiguous region, and then performs disk I/O operations, the results of which are notified to the respective processes. As described above, the file I/O performance from a plurality of processes can be improved by using the stride I/O interface and collective I/O interface.

However, the foregoing collective I/O waits for all associated processes until they have issued collective I/O requests. For this reason, if the processes separately issue collective I/O requests at different times, the process which has first issued a collective I/O is kept waiting until collective I/O requests are issued from the remaining processes. This prevents the process which has issued the collective I/O request from executing other processing during the waiting time, resulting in a problem that the activity is reduced.

SUMMARY OF THE INVENTION

To solve the foregoing problem, it is an object of the present invention to provide a file I/O control method, a file management server, and a parallel computing system which are capable of reducing a file I/O waiting time of each process while maintaining the file I/O performance associated with file I/O operations from a plurality of processes at a level equivalent to that of the collective I/O.

It is another object of the present invention to provide a file I/O control system, a file management server, and a parallel computing system which are capable of reducing a waiting time for a collective I/O request from each process without modifying the conventional collective I/O interface.

According to the present invention, the foregoing objects are achieved by a file I/O control method for use by a plurality of processes to access the same file in a shared manner, wherein each of the plurality of processes notifies a file management server of a file I/O request of the process, and hint information including information on a file region accessed by all of the plurality of processes, and the file management server provides a buffer for performing an I/O operation to and from the file region notified by the hint information. When a file I/O request from each of the plurality of processes is a file read request, data in the file region specified by the hint information is read from a disk into the provided buffer, and after reading the data from the disk, data in the provided buffer is copied between memories from a memory region corresponding to a file I/O request first issued by a process into a data region specified by the process. When the file I/O request from each of the plurality of processes is a file write request, data is copied between memories from a data region specified by each process by the file I/O request into a region in the provided buffer corresponding to the request of the process to complete a file write for each process. After the intermemory-copying by all of the plurality of processes, the data in the provided buffer is written into a file region in a disk notified by the hint information.

In the present invention which provides the foregoing processing, each user process specifies a file region read by all user processes, as hint information, in addition to a region serviced thereby, upon issuing a collective I/O request. Since the file management server can recognize I/O requests of all the user processes from the hint information when each user process issues a collective I/O request, the file management server can collectively read data for all the user processes from a disk using the hint information. As a result, the present invention can improve the processor activity resulting from elimination of the need for waiting for the issuance of collective I/O requests from the remaining processes, and the ability to promptly return the control to the user process.

Also, in the present invention, data once read from a disk is held in the buffer in the file management server until all the user processes have issued the collective I/O requests. When another user process issues a collective I/O request, only pertinent data is copied from the buffer to a user space. Therefore, the present invention can limit the required disk access to only once, when the first process issues the collective I/O request, thereby attaining the performance equivalent to that provided by a conventional collective I/O method.

The present invention can also be applied to a WRITE access to the same parallel file from a plurality of user processes, in a manner similar to the foregoing. Specifically, when each user process issues a WRITE collective I/O request, the user process specifies a file region into which all the user processes write data, as hint information. The file management server can find a buffer size required for storing merged I/O data, using this hint information, thereby immediately reserving a buffer within a file server. For this reason, the present invention can return the control to the user process immediately after collective I/O data of the user process is copied into a pertinent region in the buffer, so that the processor activity can be improved.

Further, in the present invention, the buffer reserved in the file server is held until all the user processes have completely issued the collective I/O requests, such that collective I/O request data has to be written only once into a disk at the time the collective I/O request data is all ready, thereby making it possible to attain the performance equivalent to that provided by the conventional collective I/O method.

According to the present invention, in the collective I/O processing which permits a plurality of processes to access the same file in a shared manner, an I/O wait time for each process can be reduced to improve the processor activity.

DETAILED DESCRIPTION OF THE EMBODIMENTS

In the following, embodiments of a file I/O control method, a file management server, and a parallel computing system according to the present invention will be described in detail in connection with the accompanying drawings.

Figure 1:
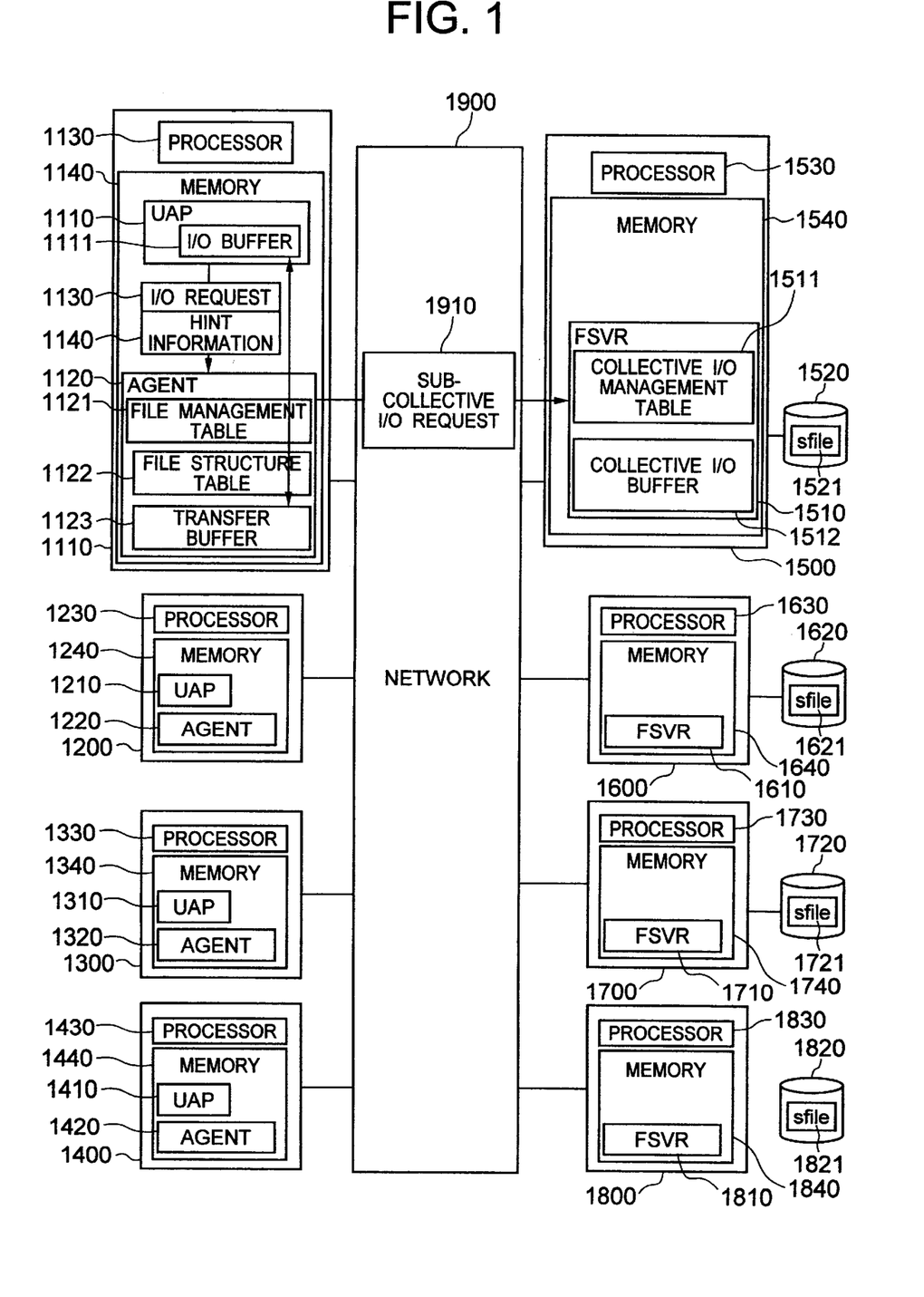
FIG. 1 is a block diagram illustrating the configuration of a parallel computing system to which the present invention is applied.

FIG. 1 is a block diagram illustrating the configuration of a parallel computing system to which the present invention is applied.

The illustrated parallel computing system comprises a plurality of computing nodes 1100, 1200, 1300, 1400; and a plurality of I/O nodes 1500, 1600, 1700, 1800 which are interconnected through a network 1900. Each of the computing nodes and I/O nodes comprises a processor 1130, 1230, 1330, 1430, 1530, 1630, 1730, 1830 and a memory 1140, 1240, 1340, 1440, 1540, 1640, 1740, 1840.

A disk 1520, 1620, 1720, 1820 is connected to each of the I/O nodes 1500, 1600, 1700, 1800, and each of the memories 1140–1840 stores a file server (program) 1510, 1610, 1710, 1810 for managing files. Each of the memories 1140–1840 on each computing node also stores a user process (program) 1110, 1210, 1310, 1410; and a file server agent (program) 1120, 1220, 1320, 1420 for receiving an I/O request from an associated user process and issuing an I/O request to a file server of an I/O node.

The file servers 1510, 1610, 1710, 1810 in the I/O nodes build a parallel file system on the plurality of disks 1520, 1620, 1720, 1820. The parallel file system may be built using, for example, a method described in "TFLOPS PFS: Architecture and Design of A Highly Efficient Parallel File System, Sharad Garg, Proceedings of Super Computing", '98, Nov. 10, 1998, or a method described in JP-A-11-15720.

The exemplary system illustrated in FIG. 1 builds the parallel file system using the method described in JP-A-11-15720. Specifically, in FIG. 1, each of the file servers 1510, 1610, 1710, 1810 and file server agents 1120, 1220, 1320, 1420 holds a file structure table which corresponds offsets in parallel files to disks, such that the file server creates an access request for each disk, referring to the file structure table, when a file I/O operation is performed.

For simplification, the embodiment of the present invention is described using an exemplary system in which parallel files are distributively stored in the respective disks in units of blocks having a fixed size, and the user processes access files in units of blocks. However, the definition of the file structure may be specified with an arbitrary file offset and size, or an access range may be specified using an arbitrary file offset and size.

It should be noted that while the system illustrated in FIG. 1 has a file server agent which resides in a computing node, and a file server which resides in an I/O node, the file server agent and file server may be considered to construct a single file management server in combination. While both components may be separated as illustrated in FIG. 1, a file management server comprised of a file server agent and a file server may reside in a computing node. Alternatively, the file management server comprised of a file server agent and a file server may be connected to the network 1900 as an independent unit. Further alternatively, the present invention may also be applied to a computing system which has a plurality of computing nodes and a single I/O node.

Figure 2A:
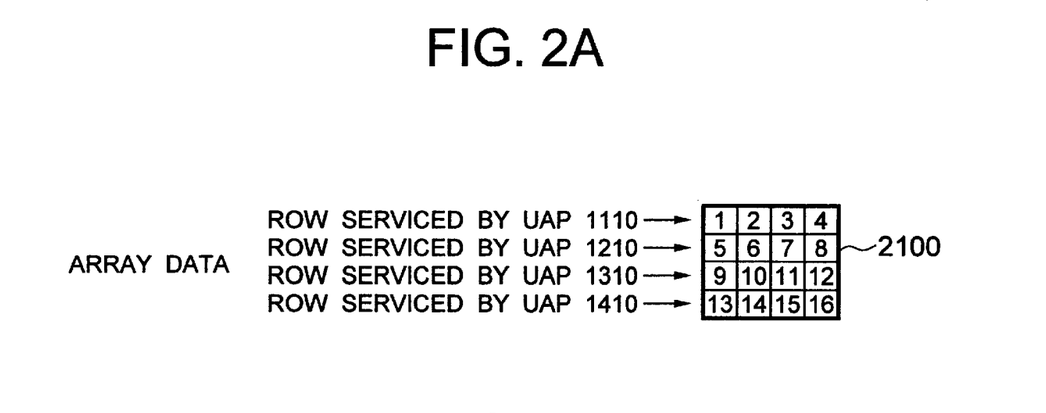
FIGS. 2A, 2B and 2C are diagrams for explaining the relationship between array data serviced by each user process, a parallel file which stores the array data, and a stripe file on each disk which stores each block of the parallel file.
Figure 2B:
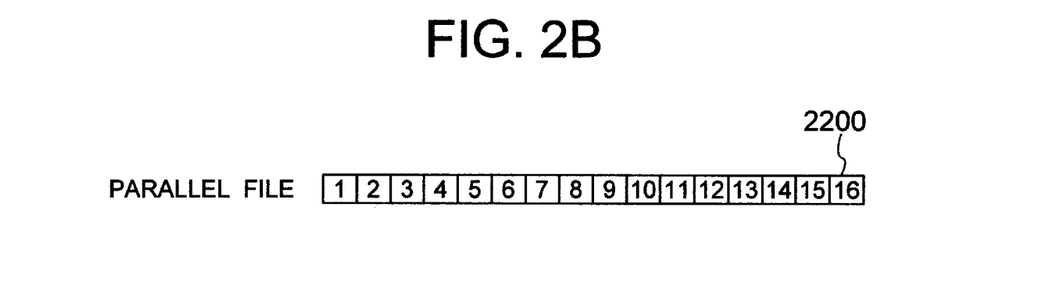
Figure 2C:
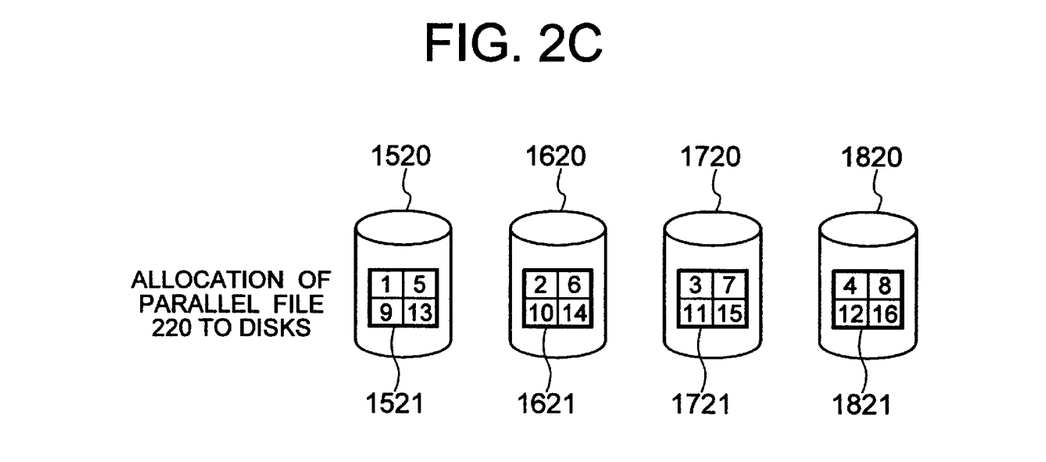

FIG. 2A shows array data 2100 serviced by the respective user processes; FIG. 2B shows a parallel file 2200 which stores the array data; and FIG. 2C shows the relationship among the stripe files 1521, 1621, 1721, 1821 on the respective disks 1520, 1620, 1720, 1820 which store associated blocks in the parallel file 2200.

The array data 2100, as shown in FIG. 2A, is comprised of 16 blocks arranged in a 4×4 matrix, and the respective user processes service different rows of the array data 2100, respectively. Each block in the array data 2100 is stored in the parallel file 2200 preferentially in the row direction. For this reason, each user process can sequentially access different regions on the parallel file 2200. For example, the user process 1110 accesses a sub-file comprised of blocks 1–4 of the array data 2200. Since these blocks are sequentially placed in the first four blocks on the parallel file 2200, the first four blocks in the parallel file 2200 are accessed in sequence.

However, the parallel file 2200 is distributively stored in the stripe files 1521, 1621, 1721, 1821 on different disks in units of blocks, a collective I/O request issued by the user process 1110 will access all of the stripe files 1521, 1621, 1721, 1821. Since accesses to a plurality of disks can be generally performed in parallel, a plurality of distributively stored blocks can be read at a high speed.

Figure 3:
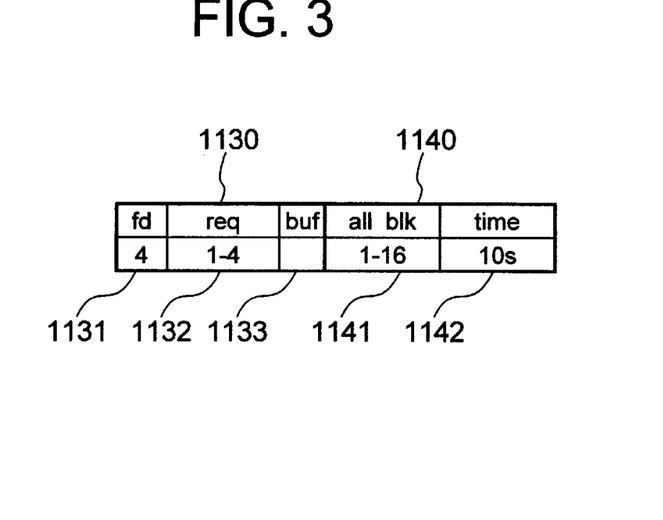
FIG. 3 is a diagram for explaining a collective I/O interface employed by each user process which is used in a first embodiment of the present invention.

As schematically shown in FIG. 3, variables required by the collective I/O interface of the present invention comprise an I/O request 1130 of a user process itself, and hint information 1140 which is a feature of the present invention. The I/O request 1130 includes a file identifier (fd) 1131; a number of a file block to be accessed (req) 1132; and an address (buf) 1133 on a memory of an I/O buffer in a computing node. On the other hand, the hint information 1140 includes a number of a file block accessed by all user processes (all_blk) 1141; and a hold time (time) 1142 of the collective I/O buffer.

The example of FIG. 3 shows that a data I/O operation is performed with an I/O buffer specified by buf for blocks 1 to 4 of a file, indicated by the file identifier "4", stored on a disk.

The example also shows that a file region accessed by all the processes is in a range of blocks 1 to 16, and that the hold time of the collective I/O buffer held in a file server is chosen to be 10 seconds. The hold time of the collective I/O buffer may be arbitrarily set by a system administrator or user, and is preferably as long as possible, though an optimal value may be predicted therefor depending on a particular file size.

Figure 4:
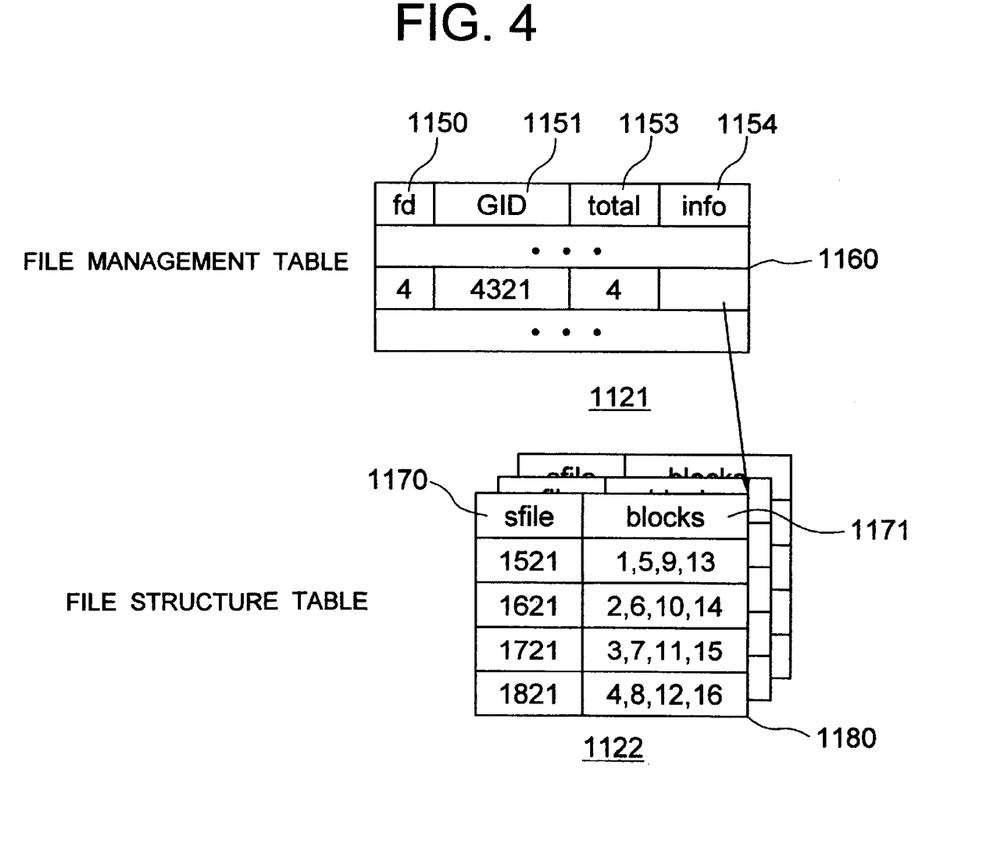
FIG. 4 is a diagram for explaining a file management table and a file structure table used for creating a sub-collective I/O request for each stripe file.

FIG. 4 is a diagram for explaining a file management table 1121 and a file structure table 1122 for use by a file server agent in creating a sub-collective I/O request for each stripe file based on a collective I/O request specified by a user process.

The file management table 1121, which is provided for managing opened files, provides an entry for each opened file. Each entry is comprised of a file identifier (df) 1150; a group identifier (GID) 1151; a total number of processes (total) 1153; and a pointer (info) 1154 to the file structure table 1122.

The group identifier (GID) 1151 is an identifier uniquely given to each open file by the system to a group of processes which perform collective I/O for the open file. The total number of processes (total) 1153 indicates the total number of processes included in a group of processes which perform the collective I/O. Then, the group identifier (GID) 1151 and total number of processes (total) 1153 are added to a sub-collective I/O request, created by a file server agent, to each stripe file, and used by a file server to identify sub-collective I/O requests from a plurality of processes.

In FIG. 4, an entry 1160 shows an exemplary entry for an open file to which the user process 1110 issues a collective I/O request 1130, indicating that the file identifier is "4"; the group identifier is "4321"; the total number of processes is "4"; and a pointer to the file structure table points to an address in the file structure table 1180.

The file structure table 1122 is comprised of an identifier (sfile) 1170 of all stripe files that constitute a parallel file; and a block number list (blocks) 1171 of a parallel file stored in each stripe file. This file structure table 1122 holds a correspondence relationship as to which stripe file stores a certain block in the parallel file 2200. The file server agent converts a collective I/O request issued by a user process to a sub-collective I/O request for each stripe file with reference to this file structure table.

In FIG. 4, one file structure table 1180 indicates the structure of a parallel file to which the user process 1110 issues a collective I/O request, and specifically shows that the stripe files 1521, 1621, 1721, 1821 store blocks (1, 5, 9, 13), (2, 6, 10, 14), (3, 7, 11, 15), and (4, 8, 12, 16), respectively. Here, the block number described in the file structure table indicates a block number from the beginning of the parallel file. Then, ordered numbers of blocks in each block number list 1171 correspond to block numbers in the stripe file associated with that block ("#1", "#2", "#3" or "#4" in FIG. 5). A sub-collective I/O request to each stripe file created by the file server agent specifies a block in a parallel file using the block number in this stripe file.

Figure 5:
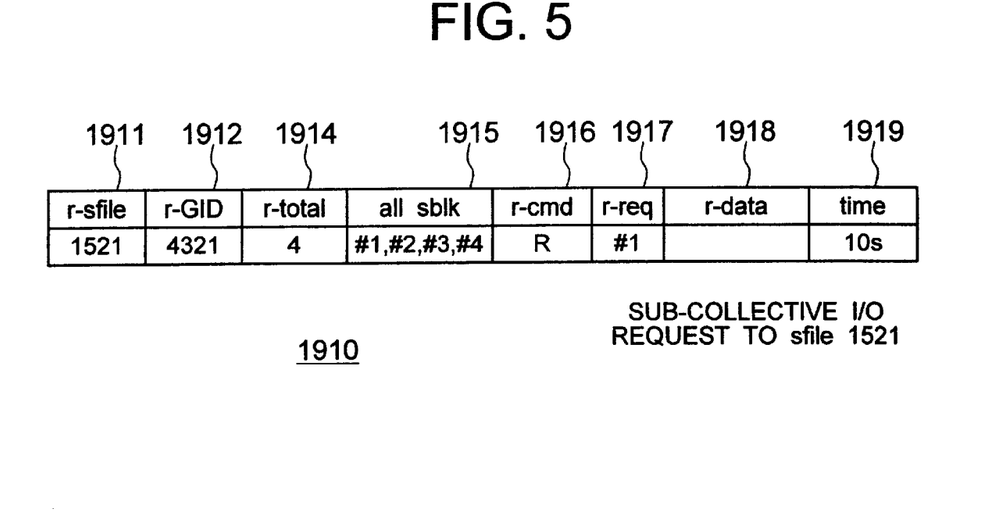
FIG. 5 is a diagram for explaining a subcollective I/O request to a stripe file which is created based on collective I/O requests of user processes.

FIG. 5 is a diagram for explaining a subcollective I/O request to a stripe file created by a file server agent based on a collective I/O request of a user process.

A sub-collective I/O request 1910 is comprised of a stripe file identifier (r-sfile) 1911; a group identifier (r-GID) 1912; a total number of processes (r-total) 1914; a number of a stripe file block (all_sblk) 1915 accessed by all the user processes; an I/O type (r-cmd) 1916; an I/O request stripe file block (r-req) 1917; data (r-data) 1918 for a write request; and a buffer hold time (time) 1919 on a file server.

The stripe file identifier (r-sfile) 1911 is acquired from the stripe file identifier list (sfile) 1170 in the file structure table 1122. The group identifier (r-GID) 1912 and total number of processes (r-total) 1914 are acquired from the group identifier (GID) 1151 and total number of processes (total) 1153 in the file management table 1121. The I/O type (r-cmd) 1916 is acquired from the collective I/O request from the user. The I/O request stripe file block (r-req) 1917 and the number (all_sblk) 1915 of a stripe file block accessed by all the user processes are created by using a corrective I/O request specified by the user and the hint information with reference to the file structure table 1122. Details on how to create the sub-collective I/O request will be described later. Here, the hint information in the sub-collective I/O request 1910 shown in FIG. 5 includes the total number of processes (r-total) 1914; stripe file block number (all_sblk) 1915; and hold time (time) 1919 of the collective I/O buffer.

Figure 6:
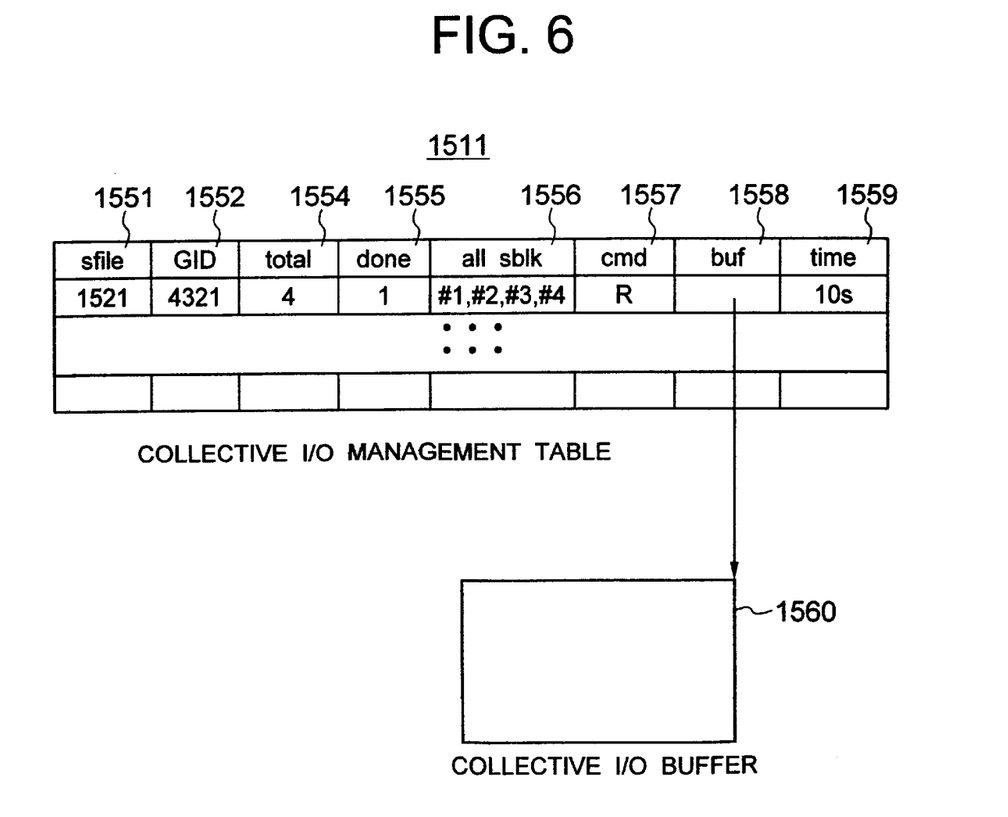
FIG. 6 is a diagram for explaining the structure of a collective I/O management table held by a file server.

FIG. 6 is a diagram for explaining the structure of the collective I/O management table held by the file server.

In FIG. 6, the collective I/O management table 1511 is provided for each file server to control the collective I/O. The collective I/O management table 1511 is assigned one entry for each collective I/O request. Also, the collective I/O buffer 1560 is assigned one by one corresponding to each entry, i.e., corresponding to each collective I/O request. Each entry is comprised of a stripe file identifier (sfile) 1551 for identifying a plurality of collective I/O requests; a group identifier (GID) 1552; a total number of processes (total) 1554; the number (done) 1555 of collective I/O processing completed processes; a stripe file block number list (all sbuf) 1556 given by the hint information; an I/O type (cmd) 1557; an address (buf) 1558 to the collective I/O buffer; and a buffer hold time (time) 1559. In this way, the total number of processes, stripe file block number, and hold time of the collective I/O buffer, which make up of the hint information for the sub-collective I/O request shown in FIG. 5, are copied and held in the collective I/O management table 1511.

The example shown in FIG. 6 indicates that a group having the group identifier "4321" executes the second collective I/O for the stripe file 1521. Also, the number of processes that constitute the group is "4" and stripe file blocks accessed by all the processes are #1, #2, #3, #4, to which read requests have been issued, and one process has already completed an I/O request. Then, a buffer valid time indicated by r-data is 10 seconds.

Next, description will be made on the collective I/O processing in the foregoing embodiment of the present invention.

Figure 7:
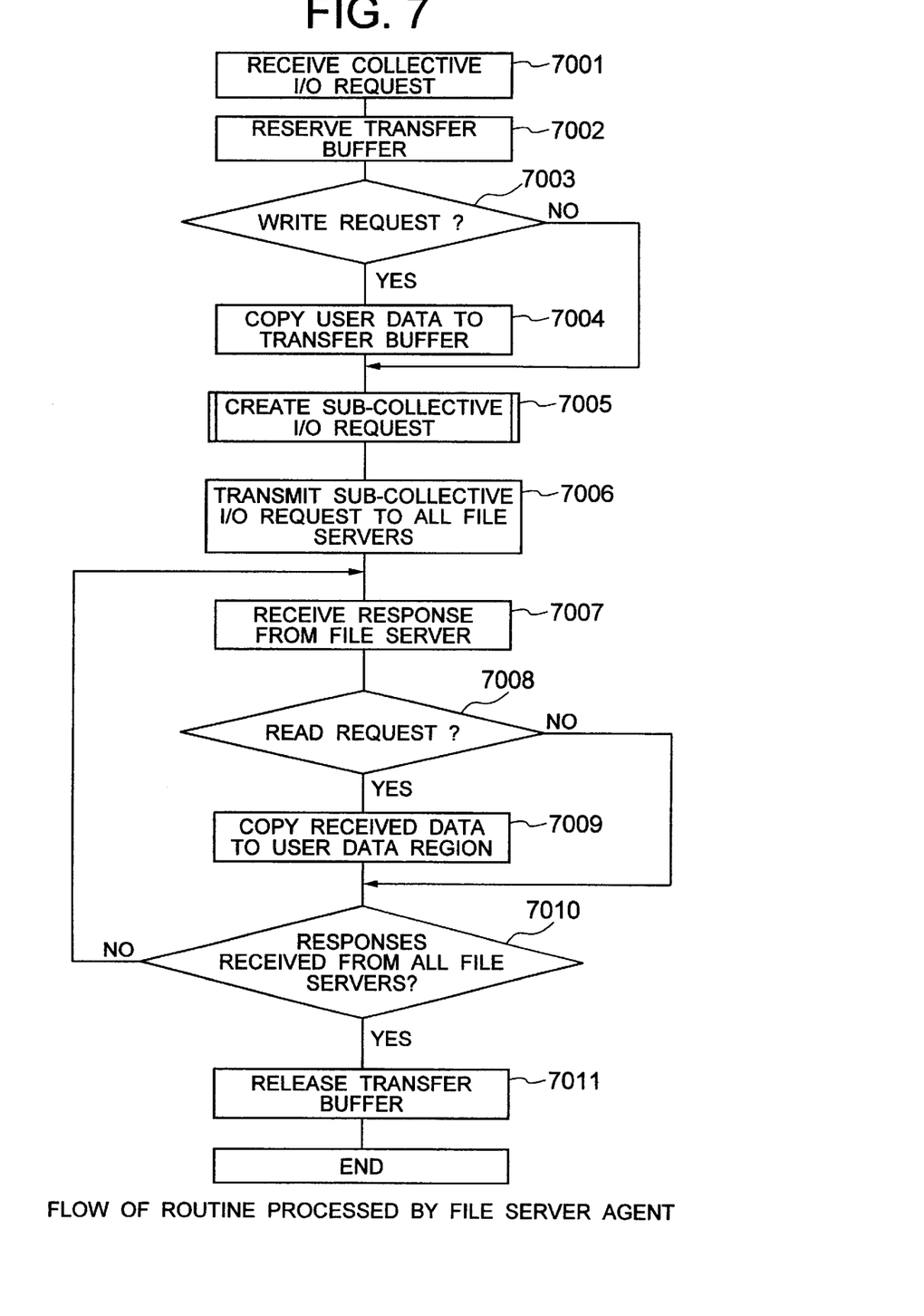
FIG. 7 is a flowchart for explaining a routine processed by a file server agent.

First, a routine processed by the file server agent will be explained with reference to FIG. 7.

(1) A collective I/O request issued by a user process using the collective I/O interface is, first of all, received by a file server agent on a node on which the user process resides (step 7001).

(2) Upon receipt of the collective I/O request, the file server agent reserves a transfer buffer for communicating I/O data of the user process to each file server, and determines whether or not the received collective I/O request is a WRITE request (steps 7002, 7003).

(3) When the determination at step 7003 shows that the collective I/O request is a WRITE request, data is copied from a data region on the memory specified by the user process to the transfer buffer, such that the data can be transferred to the file servers (step 7004).

(4) After the processing at step 7004, or when the collective I/O request is not a WRITE request at step 7003, the file server agent divides the collective I/O request of the user process into sub-collective I/O requests for respective stripe files. The division of the collective I/O request into sub-collective I/O request at this step will be described later with reference to FIG. 8 (step 7005).

(5) When the sub-collective I/O requests have been created for all stripe files in the processing at step 7005, the file server agent transmits the respective sub-file I/O requests in parallel to file servers which manage the respective stripe files, and waits for responses from the file servers. In this event, when a transmitted sub-collective I/O request is a WRITE request, the data in the transfer buffer is also transferred together (step 7006).

(6) Upon receipt of a response from each file server, the file server agent determines whether or not an I/O request is READ. When the I/O request is a READ request, received data has been stored in the transfer buffer, so that pertinent data is copied in a data region of the user process (steps 7007–7009).

(7) After the processing at step 7009, or when the I/O request is not a READ request at step 7008, the file server agent determines whether or not responses have been received from all the file servers. When received, the file server agent releases the transfer buffer and terminates the processing. Conversely, when all responses have not been received, the file server agent continues the processing from waiting for responses from the remaining file servers (steps 7010, 7011).

Figure 8:
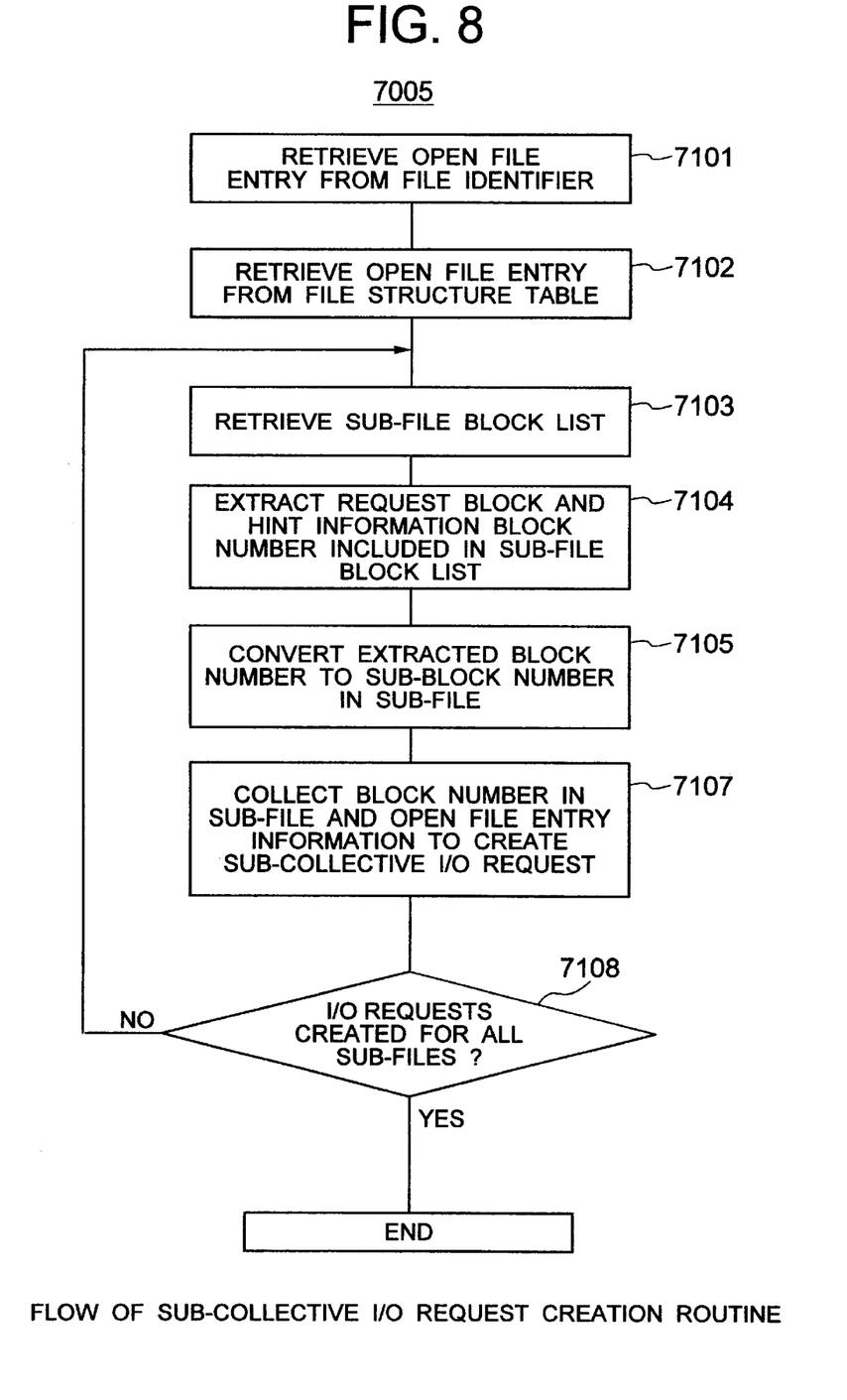
FIG. 8 is a flowchart for explaining a routine processed by the file server agent when it creates a sub-collective I/O request.

Next, a routine processed by the file server agent for creating the sub-collective I/O requests at the aforementioned step 7005 will be explained with reference to FIG. 8. The creation of the sub-collective I/O requests is performed using the file management table 1121 and file structure table 1122.

(1) First, the file server agent searches the file management table 1121 shown in FIG. 4 using a file identifier specified by a user process, and retrieves an open file entry 1160 (step 7101).

(2) Next, the file server agent retrieves an associated entry 1180 from the file structure table 1122 with reference to the field of the pointer (info) 1154 to the file structure table included in the open file entry (step 7102).

(3) As described above, since the entry 1180 retrieved at step 7102 describes all stripe files which constitute the parallel file, and a list of block numbers in the parallel file stored by each stripe file, the file server agent acquires the block number list for each stripe file (step 7103).

(4) Then, the file server agent extracts blocks stored in each stripe file out of I/O requested blocks specified by the user process and blocks accessed by all the user processes, specified by the hint information (step 7104).

(5) Further, the file server agent converts the numbers of the extracted blocks to block numbers in each stripe file, and collects the block numbers and information on the open file entries to create a sub-collective I/O request upon completion of the conversion to the block numbers. The structure of the sub-collective I/O request is as shown in FIG. 5 (steps 7105, 7107).

(6) The file server agent examines whether or not it has created sub-collective I/O requests for all the stripe files, and repeatedly executes the processing from step 7103 if not created, and terminates the processing in this flow when created (step 7108).

Figure 9:
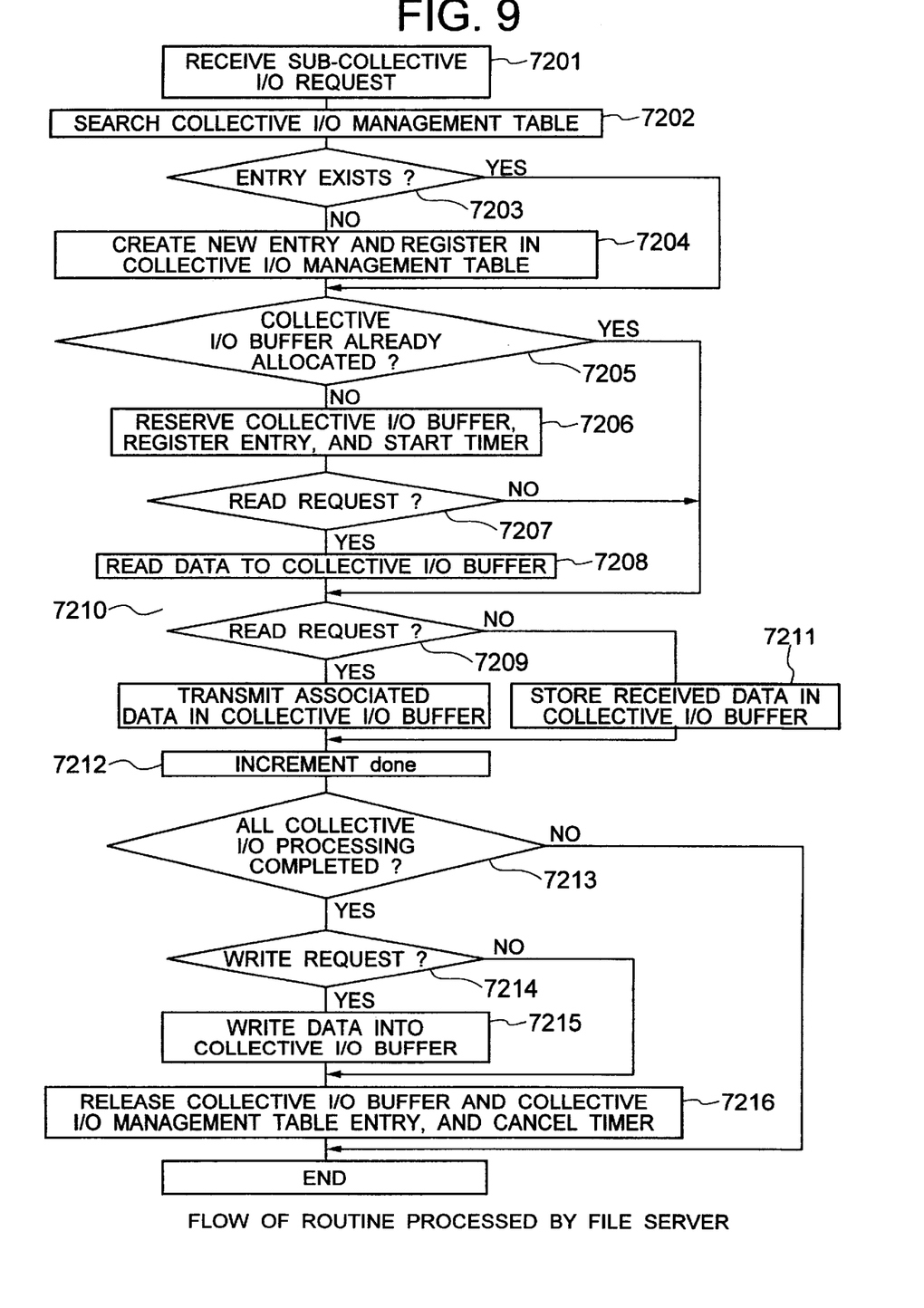
FIG. 9 is a flowchart for explaining a routine processed by a file server.

FIG. 9 is a flowchart for explaining a routine processed by a file server.

(1) Upon receipt of a sub-collective I/O request, the file server searches the collective I/O management table 1511. This search is performed using the stripe file identifier 1911 and group identifier 1912 included in the received sub-collective I/O request as keys (steps 7201, 7202).

(2) It is determined, as a result of the search at step 7202, whether or not a pertinent entry exists. If no pertinent entry exists, the file server creates a new entry and registers this created entry in the collective I/O management table 1511. In this event, the registered entry is initialized by storing information in the stripe file identifier 1911, group identifier 1912, total number of processes 1914, list 1915 of blocks accessed by all the processes, I/O type 1916, hold time 1919 of the collective I/O buffer, included in the sub-collective I/O request, in the stripe file identifier 1551, group identifier 1552, total process number 1554, list 1556 of blocks accessed by all the processes, I/O type 1557, and hold time 1559 of the collective I/O buffer of the collective I/O management table 1511, and clearing the number (done) 1555 of collective I/O processing completed processes to "0" (steps 7203, 7204).

(3) After the processing at step 7204, or when a pertinent entry has existed in the determination at step 7203, i.e., when the file server can acquire an entry in the collective I/O management table 1511, it is determined whether or not a collective I/O buffer has been allocated (step 7205).

(4) When the check at step 7205 shows that no collective I/O buffer has been allocated, meaning that the received sub-collective I/O request is the first one for the file server out of sub-collective I/O requests created from an associated I/O request, the file server reserves a collective I/O buffer. Then, the file server registers the entry in the collective I/O buffer address 1588 in the collective I/O management table, and starts a timer. In this event, a time-out period for the timer is set to the buffer hold time 1559 in the collective I/O management table (step 7206).

(5) As the collective I/O buffer can be reserved in the processing at step 7206, the file server examines whether or not the I/O request type is a READ request, and reads the contents of a block accessed by all the processes from the disk to the collective I/O buffer when the I/O request type is a READ request (steps 7207, 7208).

(6) After reading the contents of the block accessed by all the processes from the disk to the collective I/O buffer in the processing at step 7208, the file server again examines whether or not the I/O request type is a READ request when the check at step 7205 shows that the collective I/O buffer has already been allocated, or when the determination at step 7207 shows that the I/O request type is not a READ request (step 7209).

(7) When the determination at step 7209 shows that the I/O request type is a READ request, the file server transmits pertinent data on the collective I/O buffer to a file server agent which has transmitted the sub-collective I/O request. When the I/O request type is not a READ request (i.e., when it is a WRITE request), the file server writes write data included in the sub-collective I/O request into an associated region in the collective I/O buffer (steps 7210, 7211).

(8) Since the processing involved in the sub-collective I/O request from one file server agent is completed after the processing at step 7210 or 7211, the file server increments the number (done) 1555 of collective I/O processing completed processes in the collective I/O management table (step 7212).

(9) The file server further compares the number (done) 1555 of collective I/O processing completed processes with the total number of processes (total) 1554 to examine whether or not the collective I/O processing has been completed for all the processes. The processing at this step terminates when the collective I/O processing has not completed for all the process, and the file server waits for receipt of a next sub-collective I/O request (step 7213).

(10) When the determination at step 7213 shows that the collective I/O processing has been completed for all the processes, the file server examines whether or not the I/O request type is a WRITE request, and writes the contents of the collective I/O buffer into the disk when the I/O request type is a WRITE request (steps 7214, 7215).

(11) After the processing at step 7215, or when the determination at step 7214 shows that the I/O request type is not a WRITE request, the file server releases the collective I/O buffer and the entry of the collective I/O management table, cancels the timer, and terminates its processing (step 7216).

Figure 10:
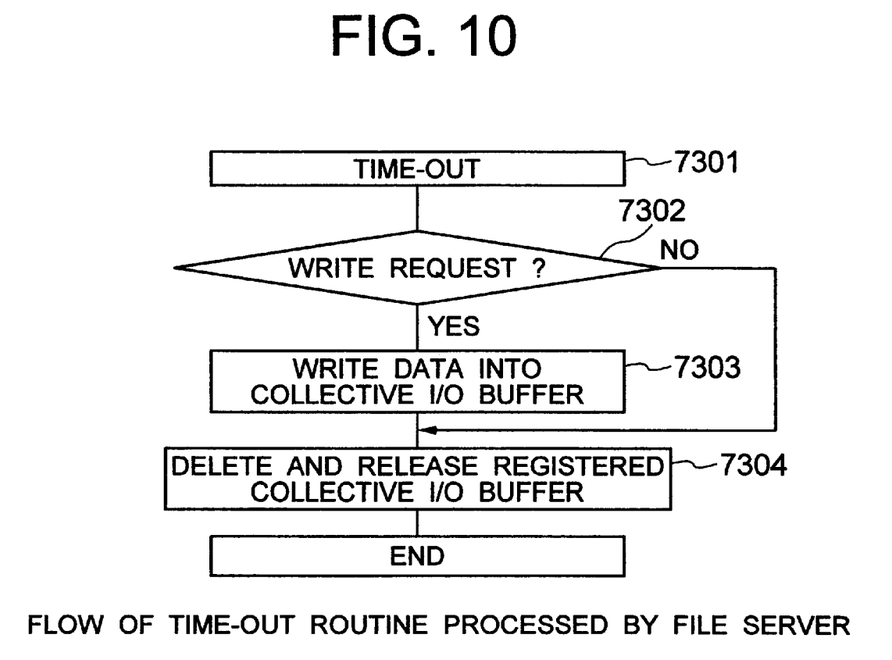
FIG. 10 is a flowchart for explaining a routine of time-out processing of a collective I/O buffer.

FIG. 10 is a flowchart for explaining a routine of a file server for time-out processing which is performed upon expiration of the hold time of the collective I/O buffer.

(1) When the hold time of the collective I/O buffer expires to result in time-out, the file server examines whether or not the I/O type of the collective I/O buffer is a WRITE request, and writes data in the collective I/O buffer in the disk when the I/O type is a WRITE request (steps 7301–7303).

(2) After writing the data into the disk at step 7303, or when the determination at step 7302 shows that the I/O type of the collective I/O buffer is not a WRITE request, the file server deletes the associated collective I/O buffer address from the collective I/O management table, releases the collective I/O buffer, and terminates the processing (step 7304).

The foregoing time-out processing can eliminates the need for holding a memory for a certain time or more. Also, when a residual sub-collective I/O request is received after the time-out, the collective I/O buffer can be again ensured at that time, thereby causing no problem even if the buffer is released.

According to the first embodiment of the present invention, as each user process notifies the hint information together with a collective I/O request, and the collective I/O buffer is provided within a file server, it is possible to eliminate the need for waiting for collective I/O requests of all processes in a group. As a result, each user process will not be kept waiting due to the collective I/O processing for nothing, thereby making it possible to increase the CPU activity. Also, according to the first embodiment of the present invention, since a hold time can be specified for the collective I/O buffer, it is possible to prevent the memory from being occupied for a long time for nothing.

Next, a second embodiment of the present invention will be described with reference to FIGS. 11 through 15.

The second embodiment of the present invention, described below, differs from the first embodiment in that the collective I/O request is separated from the notification of hint information. Specifically, the first embodiment notifies the hint information from a file server agent to a file server upon issuing a collective I/O request, whereas the second embodiment notifies the file server of the hint information prior to a collective I/O request. By thus separating the notification of hint information from the collective I/O request, the CPU activity can be improved without modifying the conventional collective I/O interface.

Similar to the first embodiment, the second embodiment of the present invention is applied to the parallel computing system illustrated in FIG. 1 for operation. Also, each user process accesses to the array data shown in FIG. 2, in a manner similar to the first embodiment. Then, the second embodiment differs from the first embodiment in the following three aspects: a method of issuing an I/O request from a user process, a file management table held by a file server agent, and a processing method operated by the file server agent. The remaining aspects are similar in the two embodiments. Therefore, the following description will focus only on the aspects different from the first embodiment.

Figure 11:
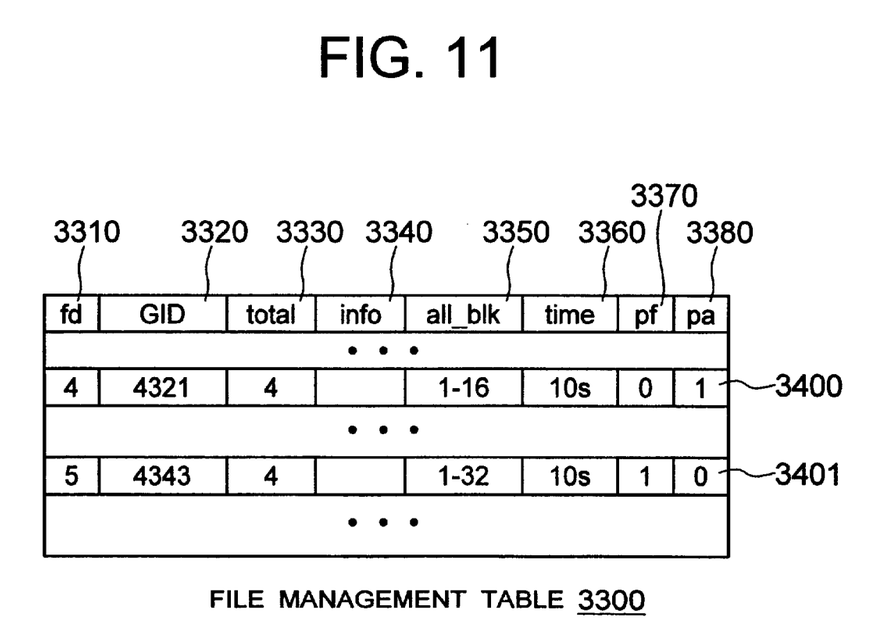
FIG. 11 is a diagram for explaining the structure of a file management table for use in a second embodiment of the present invention.

FIG. 11 is a diagram for explaining the structure of a file management table 3300 for use in the second embodiment of the present invention.

In FIG. 11, an entry 3400 (or 3401) in the file management table 3300 on the file sever agent side is comprised of a file identifier (fd) 3310; a group identifier (GID) 3320; a total number of processes (total) 3330; a pointer (info) 3340 to a file structure table; a list (all_blk) 3350 of blocks accessed by all processes; a hold time (time) 3360 of a collective I/O buffer; a prefetch instruction field (pf) 3370; and a preallocate instruction field (pa) 3380. Within these fields, the file identifier 3310, group identifier 3320, total number of processes 3330, and pointer 3340 to a file structure table are identical to those described in connection with FIG. 4.

The list 3350 of blocks accessed by all processes, hold time 3360 of the collective I/O buffer, prefetch instruction field 3370, and preallocate instruction field 3380 are all provided for holding information given by a hint information notification interface, later described. The entry 3400 is created for instructing a preallocate, while the entry 3401 is created for instructing a prefetch.

Figure 12:
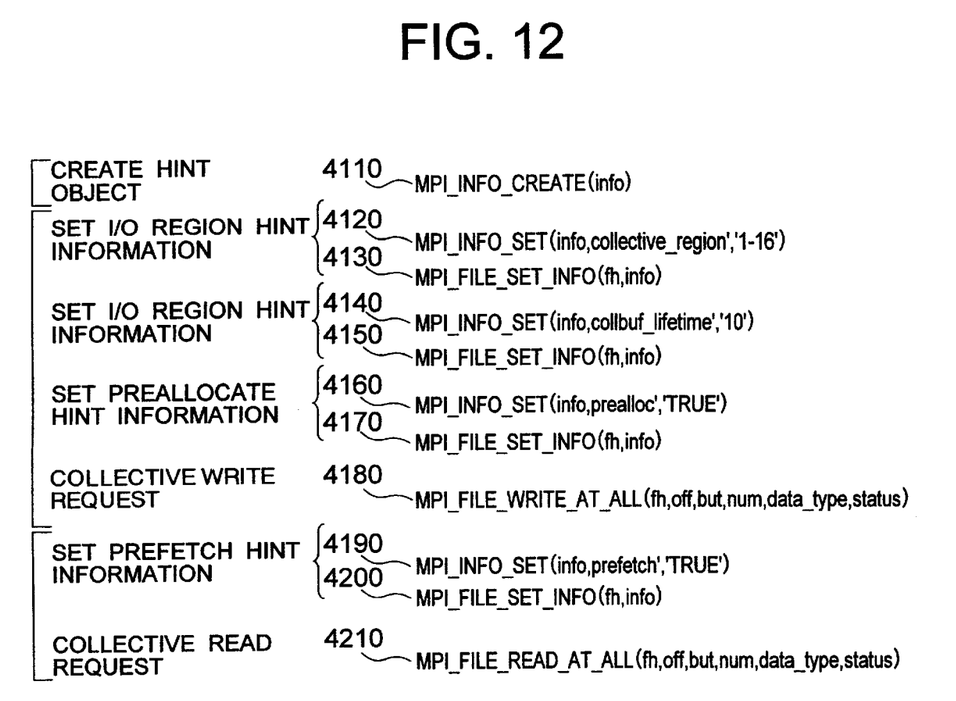
FIG. 12 is a diagram for explaining a user interface for use in the second embodiment of the present invention.

FIG. 12 is a diagram for explaining a user interface for use in the second embodiment of the present invention. The user interface used herein is fully identical to the interface MPI-IO defined in the literature MPI-2, so that the following description will not be directed to a specific method of using the interface but will be narrowed down to portions of the user interface newly defined in the second embodiment of the present invention.

In the second embodiment of the present invention, a user program, prior to issuing a collective I/O request, creates a hint object (4110), sets information on the hint object (4120, 4140, 4160, 4190), and notifies the hint information (4130, 4150, 4170, 4200) using MPI-10. Preallocate hint information settings 4160, 4170 are required prior to a collective write request 4180, and prefetch hint information settings 4190, 4200 are required prior to a collective read request 4210.

The hint information previously defined in MPI-2 only includes static information such as a buffer size used by the system in the collective I/O processing, the number of nodes which participate in the execution of the collective I/O processing, the structure of a parallel file, and the like, and the hint information notification interface itself must be collectively executed.

On the other hand, in the second embodiment of the present invention, the hint information additionally includes hint information "collective_region" 4120 on a region accessed by all processes; a hold time "collbuf_lifetime" 4140 of a collective I/O buffer; "prealloc" 4160 indicative of preallocate; and "prefetch" 4190 indicative of prefetch. Also, for notifying the foregoing hint information, the hint information notification interface is configured to avoid queuing among processes. Further, the queuing among processes is also eliminated for a collective I/O request which specifies a file identifier to which the hint information "collective_region" is set.

A collective WRITE request MPI_WRITE_AL_ALL 4180 and a collective READ request MPI_READ_AT_ALL 4210 are identical to those defined in MPI-2 except that queuing is avoided among processes when the "collective-region" hint information is set.

Figure 13:
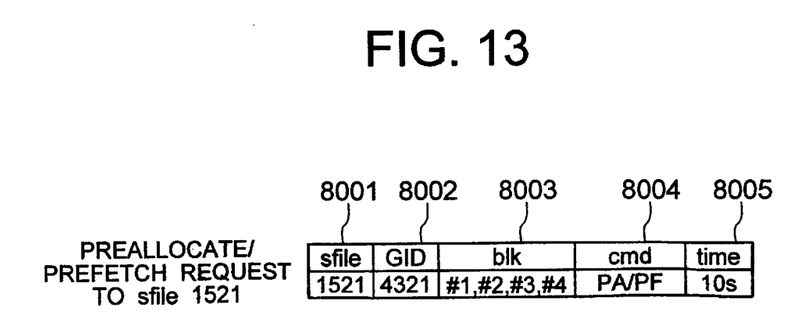
FIG. 13 is a diagram showing a format of a preallocate/prefetch request which is transmitted from a file server agent to a file server of each stripe file.

FIG. 13 is a diagram showing a format of a preallocate/prefetch request which is transmitted from a file server agent to a file server of each stripe file by the user's prefetch hint information and preallocate hint information.

The preallocate/prefetch request is comprised of a stripe file identifier (sfile) 8001; a group identifier (GID) 8002; a number of block (blk) 8003 accessed by all processes; a command field (cmd) 8004 for specifying a preallocate (PA) or a prefetch (PF); and a hold time (time) 8005 of a collective I/O buffer.

Figure 14:
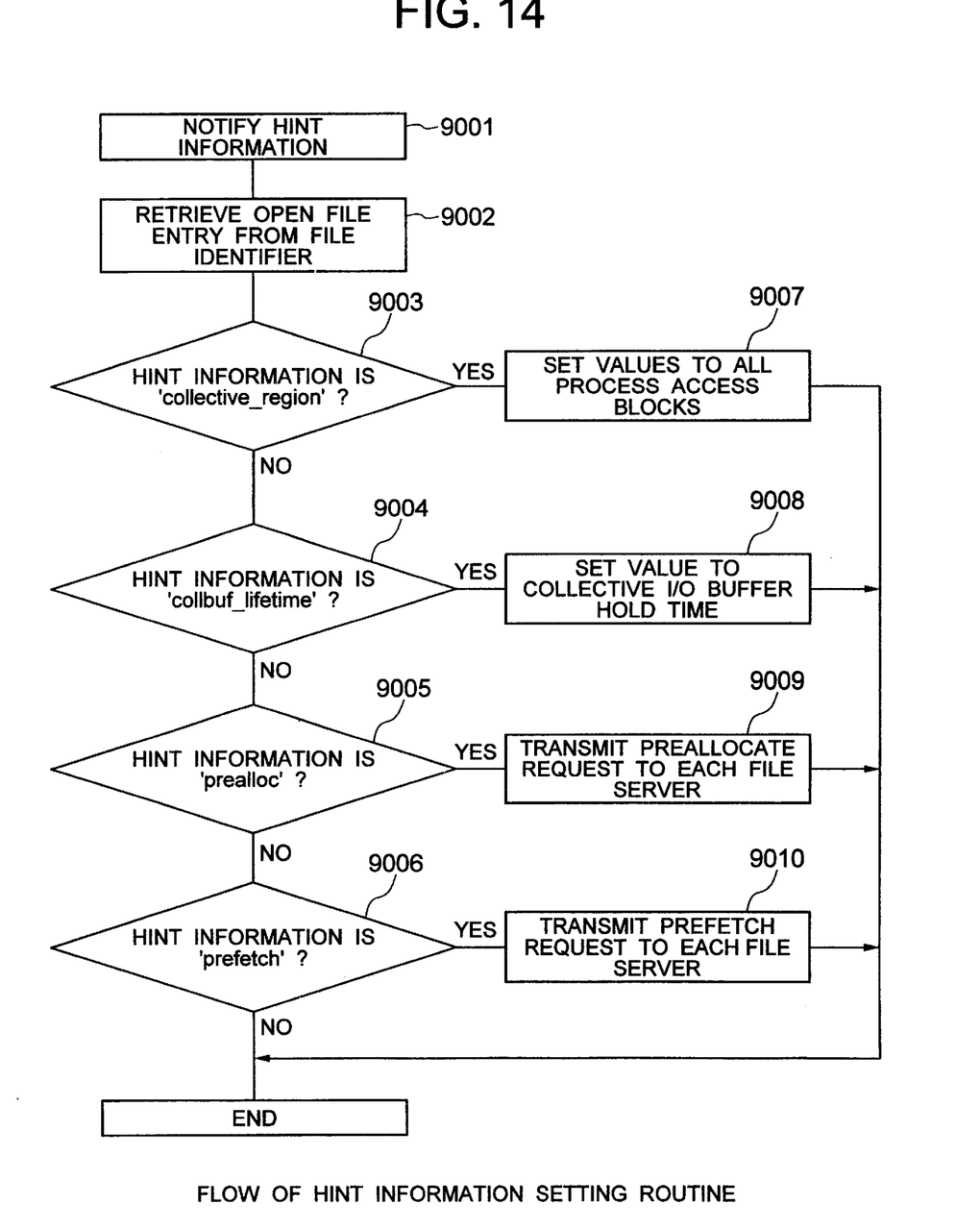
FIG. 14 is a flowchart for explaining a routine processed by the file server agent when a user process executes a hint information notification interface.

FIG. 14 is a diagram for explaining a routine processed by a file server agent when a user process executes the hint information notification interface.

(1) As the user process notifies hint information, the file server agent searches the file management table 3300 using a file identifier specified in the hint information to retrieve an open file entry (steps 9001, 9002).

(2) The file server agent checks whether or not the type of the hint information is "collective_region", and stores a value specified by the hint information in a field 3350 of the open file entry for storing a block accessed by all processes when the type of the hint information is "collective region", followed by termination of the processing (steps 9003, 9007).

(3) When the check at step 9003 shows that the type of the hint information is not "collective region", the file server agent checks whether or not the type of the hint information is "collbuf_lifetime", and stores a value specified in the hint information in a field of the open file entry for holding a hold time of a collective I/O buffer when the type of the hint information is "collbuf_lifetime", followed by termination of the processing (steps 9004, 9008).

(4) When the check at step 9004 shows that the type of the hint information is not "collbuf_lifetime", the file server agent checks whether or not the type of the hint information is "prealloc", and transmits a preallocate request to a file server which manages each stripe file when the type of the hint information is "prealloc", followed by termination of the processing (steps 9005, 9009).

(5) When the check at step 9005 shows that the type of the hint information is not "prealloc", the file server agent checks whether or not the type of the hint information is "prefetch", and transmits a prefetch request to a file server which manages each stripe file when the type of the hint information is "prefetch", and terminates the processing without performing anything when the type of the hint information is not "prefetch" (steps 9006, 9010).

The preallocate request and prefetch request transmitted to each file server at the aforementioned steps 9009, 9010 are created in formats described in connection with FIG. 13. In this event, a block prefetched from each stripe file and a block preallocated from each stripe file are created by converting the block (all_blk) 3350 accessed by all processes, registered in an entry of the file management table 3300, to a block number for each stripe in a manner similar to the creation of a sub-collective I/O request in the previously described first embodiment of the present invention. Also, the file server agent terminates the processing without waiting for a response to the preallocate request or prefetch request.

Figure 15:
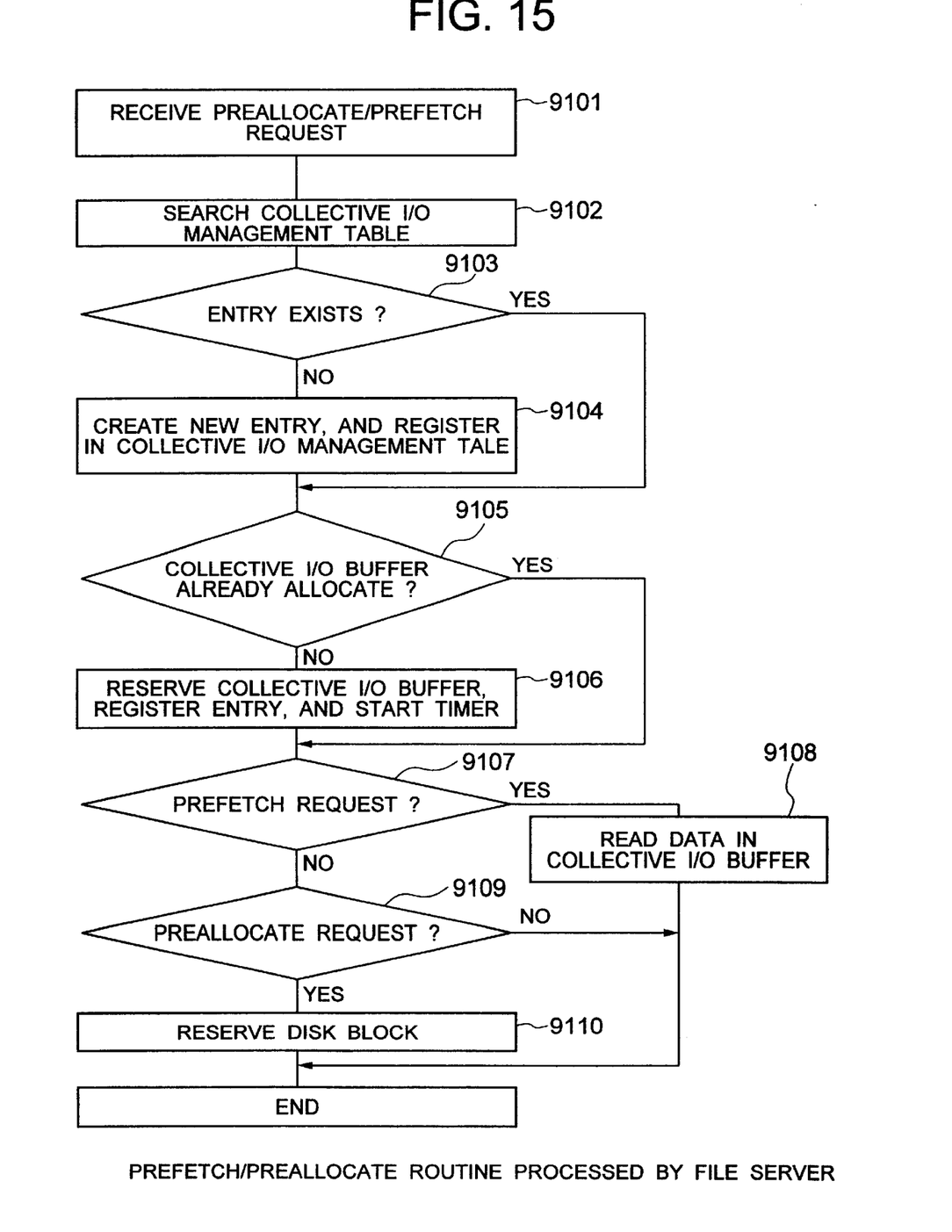
FIG. 15 is a flowchart for explaining a routine processed in the file server when it receives a prefetch request or a preallocate request.

FIG. 15 is a flowchart for explaining a routine processed by a file server which has received a prefetch request or a preallocate request.

(1) Upon receipt of a preallocate request or a prefetch request, the file server searches the collective I/O management table 1150. This search is performed using the stripe file identifier and group identifier as keys, in a manner similar to the processing of the file server in the embodiment of the present invention, previously explained in connection with FIG. 9 (steps 9101, 9102).

(2) The file server determines from the result of the search at step 9102 whether or not a pertinent entry exists. If no pertinent entry exists, the file server creates and initializes a new entry, and then registers the entry in the collective I/O management table. The entry is initialized using the stripe file identifier 8001; group identifier 8002; block 8003 accessed by all processes; and hold time 8005 of a collective I/O buffer included in the prefetch request or preallocate request (steps 9103, 9104).

(3) After acquiring the initialized entry by the processing at step 9104, or when the determination at step 9103 shows that a pertinent entry exists in the collective I/O management table, the file server examines whether or not a collective I/O buffer has been allocated. When no collective I/O buffer has been allocated, the file server newly allocates a collective I/O buffer, registers the collective I/O buffer in the entry, and starts a timer (steps 9105, 9106).

(4) After the collective I/O buffer is allocated in the processing at step 9106, or when the determination at step 9105 shows that a collective I/O buffer has already existed, the file server examines whether or not the request is a prefetch request. The file server reads data from a stripe file to the collective I/O buffer when the request is a prefetch request, followed by termination of the processing (steps 9107, 9108).

(5) When the determination at step 9107 shows that the request is not a prefetch request, the file server next examines whether or not the request is a preallocated request. As a result, the file server terminates the processing without performing anything when the request is not a preallocate request, and reserves a desk block when the request is a preallocate request, followed by termination of the processing (steps 9109, 9110).

In the processing described above, for either of the prefetch request and the preallocate request, the block (blk) 8003 accessed by all processes is used as a file block for use with the request. The data read at step 9108 and the reservation of a disk block at step 9110 may be executed only at the first time by determining whether or not these steps have been executed.

In the second embodiment of the present invention, the processing in the file server agent and file server, performed when a user process issues a collective I/O request, is basically similar to the first embodiment. Only exception lies in that in the first embodiment, information on a file block accessed by all processes and a hold time of the collective I/O buffer, required for the file server agent to create a sub-collective I/O request, is acquired from the hint information which is specified by the user simultaneously with a collective I/O request, whereas in the second embodiment, such information is acquired from an entry of the file management table.

According to the second embodiment of the present invention, since the system comprises the hint information notification interface and holds the hint information in the file management table, the CPU activity can be improved without modifying the conventional collective I/O interface. Also, according to the second embodiment of the present invention, since the hint information notification interface is separated, and hint information is newly provided for a preallocate and a prefetch, such processing can be executed in parallel with the processing of user processes, thereby improving the processing performance of the system.

It will be further understood by those skilled in the art that the foregoing description has been made on embodiments of the invention and that various changes and modifications may be made in the invention without departing from the spirit of the invention and scope of the appended claims.

What is claimed is:

1. A file I/O control method for use by a plurality of processes to access the same file in a shared manner, comprising the steps of:

notifying a file management server from each of said plurality of processes of a file I/O request of the process, and hint information including information on a file region accessed by all of said plurality of processes;

providing a buffer for performing an I/O operation to and from the file region notified by the hint information in said file management server;

when a file I/O request from each of said plurality of processes is a file read request, reading data in the file region specified by the hint information from a disk into said provided buffer, and after reading the data from said disk, intermemory-copying data in a memory region in said provided buffer, corresponding to a file I/O request first issued by a process, into a data region specified by said process which first issues the file I/O request;

when the file I/O request from each of said plurality of processes is a file write request, intermemory-copying data from a data region specified by each process by the file I/O request into a region in said provided buffer corresponding to the request of the process to complete a file write for each process; and after intermemory-copying the data from all of said plurality of processes, writing the data in said provided buffer into a file region in a disk notified by the hint information.

2. A file I/O control method according to claim 1, wherein said buffer provided by said file management server is provided when a first one of said plurality of processes notifies the hint information, and discarded when a last one of said plurality of processes terminates a file I/O request.

3. A file I/O control method according to claim 1, wherein each of said processes notifies said file management server of the hint information simultaneously with an I/O request or prior to the I/O request.

4. A file I/O control method according to claim 1, wherein when the file I/O request from each of said processes is a file read request, data is read from a file region in a disk specified by the hint information for said provided buffer when the first one of said plurality of processes notifies said file management server of the hint information.

5. A file I/O control method according to claim 1, wherein a file I/O request notified from each of said processes is completed at the time at which the intermemory-copy is completed between said buffer provided by said file management server and a data region specified by each process irrespective of whether or not a file I/O request from another process is notified to said file management server.

6. A file I/O control method according to claim 1, wherein the hint information notified by each of said processes includes a hold time of said buffer provided by said file management server, and said file management server holds said provided buffer until the file I/O requests notified by all of said plurality of processes are completed or until the hold time included in the hint information expires.

7. A file I/O control method according to claim 1, wherein the hint information notified by each of said processes includes information for specifying whether or not a prefetch is performed prior to issuance of a file read request or information for specifying whether or not a disk preallocate is performed prior to issuance of a file write request, wherein said file management server previously reads data in a specified file region from a disk to said buffer provided by said file management server when the hint information specifies execution of the prefetch, and said file management server previously reserves a region for storing all data associated with said plurality of processes on a disk when the hint information specifies execution of the preallocate.

8. A file management server for enabling a plurality of processes to access the same file in a shared manner, comprising:

means for receiving hint information including a file I/O request from each of said plurality of processes, and information on a file region accessed by all of said plurality of processes;

means for reserving a buffer for holding data in the file region notified by the hint information, said file region being accessed by all of said plurality of processes;

means for collectively reading the data in the file region specified by the hint information, said file region being accessed by all of said plurality of processes, from a disk to said reserved buffer when the file I/O request from each of said plurality of processes is a file read request;

means for collectively writing the contents of said buffer into a disk when the file I/O request from each of said plurality of processes is a file write request; and means for completing file I/O processing when a file I/O request is issued from each process by intermemory-copying data between a data region of said process and a region of said buffer corresponding thereto.

9. A file management server according to claim 8, further comprising:

means for receiving information for specifying whether or not a prefetch is performed prior to issuance of a file read request included in the hint information notified by each of said processes, or information for specifying whether or not a disk preallocate is performed prior to issuance of a file write request;

means for previously reading data from a disk to said buffer asynchronously with the processing of said process when the hint information specifies execution of the prefetch; and means for performing the disk region preallocate asynchronously with the processing of said process when the hint information specifies execution of the preallocate.

10. A parallel computing system for operating in concert a plurality of processes which execute a parallel program to perform computations, said parallel computing system comprising the file management server according to claim 8, wherein when said plurality of processes executing said parallel program simultaneously access the same file, each of said processes notifies a file management server of hint information including information on a file region accessed by all of said plurality of processes not later than issuance of a file I/O request issued by said each process.

11. A file I/O control method in a parallel computing system having a plurality of computing nodes and at least one I/O node, said method comprising the steps of:

executing a plurality of processes on said plurality of computing nodes, respectively;

based on hint information indicative of a data block required by a plurality of collective I/O read requests for reading the same file from said plurality of processes, reserving a buffer in said I/O node for a portion of said data block held by said I/O node, out of said data block indicated by said hint information;

responding to a first collective I/O read request by writing said data block held by said I/O node into said buffer in response to said first collective I/O read request, and reading a data block corresponding to said first collective I/O read request from said data block written into said buffer; and responding to a subsequent collective I/O read request by reading a data block corresponding to said collective I/O read request from said data block written into said buffer.

12. A file I/O control method according to claim 11, wherein said hint information is added to each said collective I/O read request.

13. A file I/O control method according to claim 11, wherein said hint information is issued to said I/O node prior to each said collective I/O read request.

14. A file I/O control method in a parallel computing system having a plurality of computing nodes and at least one I/O node, said method comprising the steps of:

executing a plurality of processes on said plurality of computing nodes, respectively;

based on hint information indicative of a data block required by a plurality of collective I/O write requests for writing the same file from said plurality of processes, reserving a buffer in said I/O node for a portion of said data block held by said I/O node, out of said data block indicated by said hint information;

responding to each of said plurality of collective I/O write requests to write a data block associated with the collective I/O write request into a region of said buffer for the collective I/O write request; and holding the data block written into said buffer in said I/O node after writing a data block into said buffer associated with a last collective I/O write request.

15. A file I/O control method according to claim 14, wherein said hint information is added to each said collective I/O write request.

16. A file I/O control method according to claim 14, wherein said hint information is issued to said I/O node prior to each said collective I/O write request.

17. A file I/O control method in a parallel computing system having a plurality of computing nodes and at least one I/O node, said method comprising the steps of:

executing a plurality of processes on said plurality of computing nodes, respectively;

based on hint information indicative of a data block required by a plurality of collective I/O requests for accessing the same file from said plurality of processes, reserving a buffer in said I/O node for a portion of said data block held by said I/O node, out of said data block indicated by said hint information; and responding to each of said plurality of collective I/O requests by accessing a region of said buffer corresponding to the collective I/O request.

18. A file I/O control method according to claim 17, wherein said hint information is added to each said collective I/O request.

19. A file I/O control method according to claim 17, wherein said hint information is issued to said I/O node prior to each said collective I/O request.

* * * * *